April 29, 1941.  E. S. WITCHGER  2,240,432
JOINT
Filed March 13, 1939  2 Sheets-Sheet 2
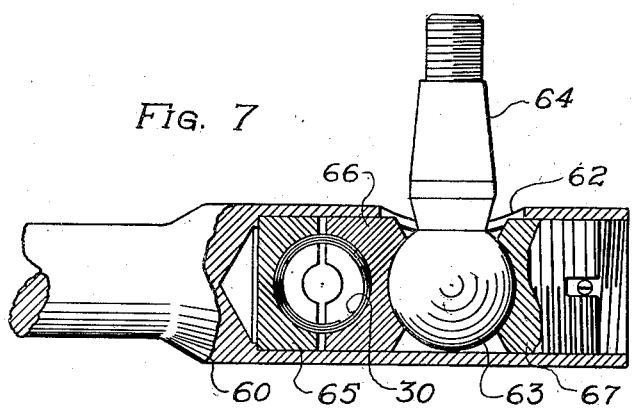
Fig. 7
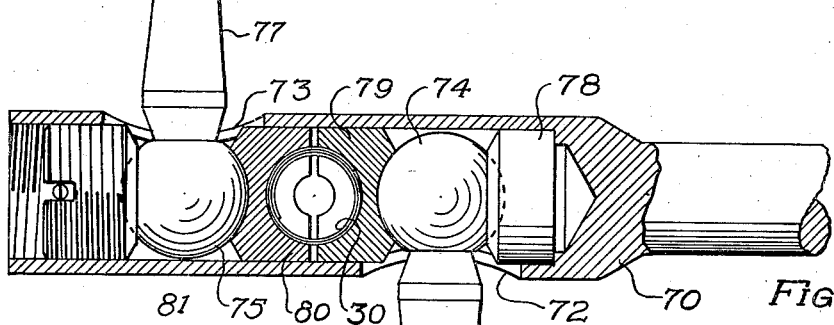
Fig. 8
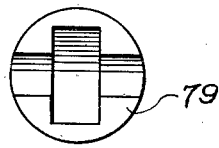
Fig. 10
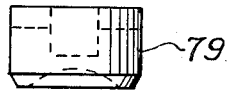
Fig. 9
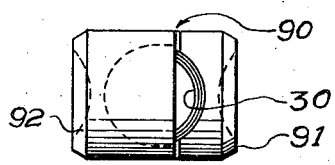
Fig. 12
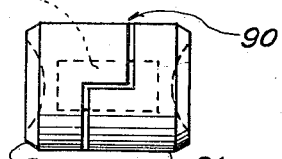
Fig. 13
Fig. 11
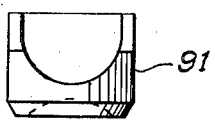
Fig. 14
INVENTOR
EUGENE S. WITCHGER
BY John F. Stark
ATTORNEY Patented Apr. 29, 1941

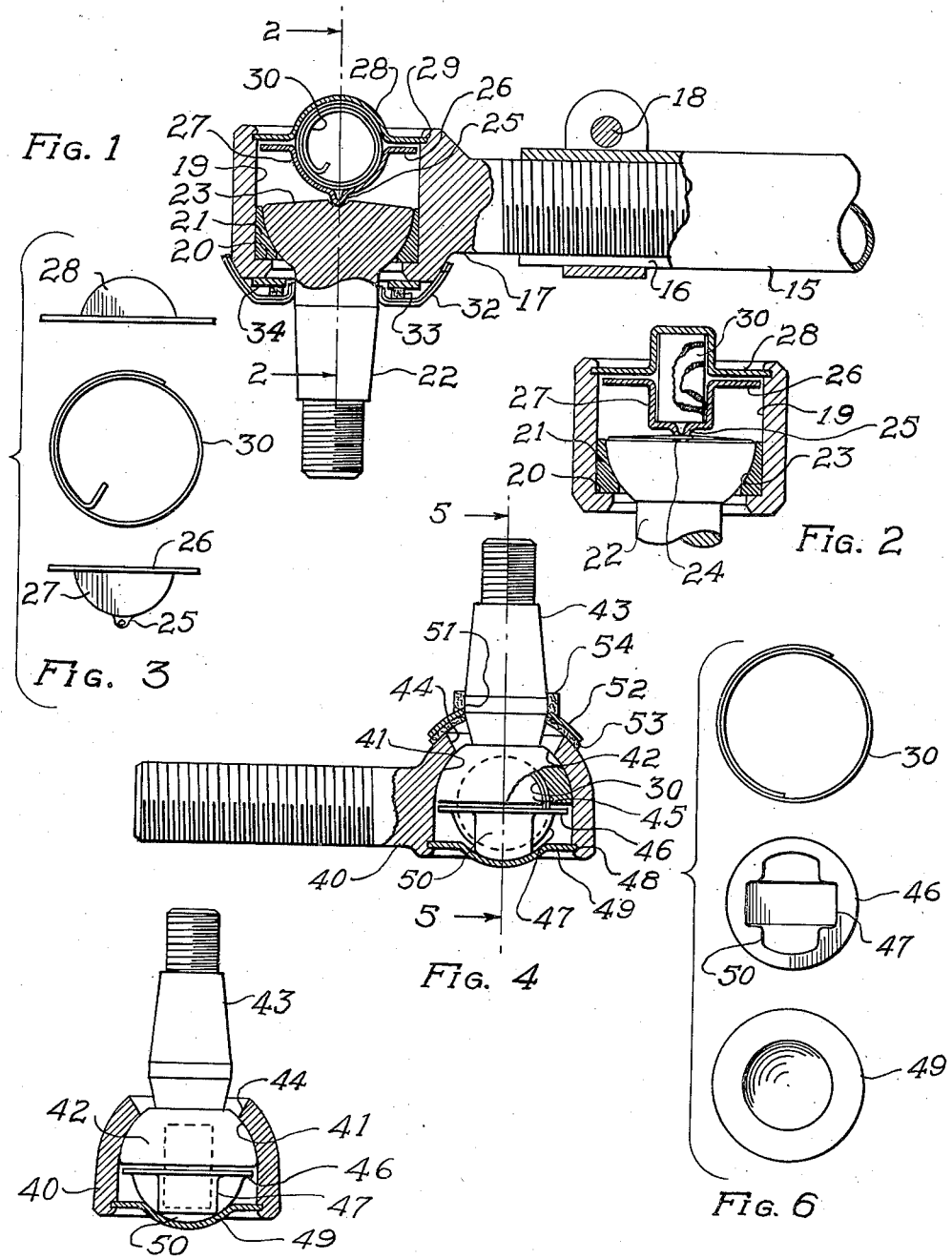

2,240,432

UNITED STATES PATENT OFFICE 2,240,432

JOINT

Eugene S. Witchger, Detroit, Mich.

Application March 13, 1939, Serial No. 261,442

4 Claims. (Cl. 287—90)

This invention relates to a self-adjusting joint structure for control mechanisms to compensate for wear of parts and more specifically to a self-adjusting joint between a tie rod and steering arm in the steering mechanism of a motor vehicle.

The objects of this invention are to provide a self-adjusting tie rod joint of the ball and socket type having a low turning torque factor for oscillating the ball stud; to provide a structure that reduces the spring force seating the ball segment thus reducing wear but that greatly resists all normal shock tending to produce collapse of said spring; to hold said ball segment of the tie rod joint against its seat under all operating conditions and thus minimize movement therebetween, and transmission of shock loads between the two members; to produce a spring joint having a relatively low outward pressure and a relatively greater resistance to radial inward movement; the provision of a self-adjusting joint that will maintain correct steering geometry after long usage; to provide a tie rod joint that is simple in design, free from wedge and eccentric members and suitable for heavy duty requirements.

A further object of this invention is the provision of a tie rod joint of the yoke and ball type in which the steering forces are directly transmitted by a spring element, having a characteristic high resistance to external forces and a low outward spring pressure without lost motion or lag in any direction; to provide a tie rod joint in which steering forces are taken directly on a spring providing positive action, ease of adjustment and safety under all conditions due to the differential characteristics of the spring element under expansive and contractive forces.

A still further object of this invention is the provision in a joint structure of the ball and yoke type steering connection with double ball studs at the end thereof for use in parallelogram steering mechanisms of the type in which each ball therein has a low seating pressure, zero lash, and a self-adjusting spring constantly removing accumulated worn clearances between each ball and its socket.

Secondary objects of this invention in general are to provide a tie rod joint that has good wearing qualities due to low pressure between the ball and its seat; that is free from axial movement, shock loads and noise due to this movement; and is easy and positive in action because of low seating pressure and simultaneously has a positive holding power equal to all normal and abnormal road shocks.

Other objects and advantages of this invention will become apparent to those skilled in the art to which this invention relates from the following detailed description of the accompanying drawings illustrating the preferred embodiments thereof; wherein:

Fig. 1 is a longitudinal vertical section through a tie rod end embodying the joint of this invention; and Fig. 2 is a cross-sectional view through the joint of Fig. 1 taken on the line 2—2 thereof; and Fig. 3 is an exploded view of the ribbon spring and spring nesting members of Fig. 1; and Fig. 4 is a longitudinal vertical section through a slightly modified tie rod end and embodying the joint of this invention; and Fig. 5 is a cross-sectional view of the joint shown in Fig. 4 and taken substantially on the line 5—5 thereof; and Fig. 6 is an exploded view of the spring, its nest, and bearing plate as used in Figs. 4 and 5; and Fig. 7 illustrates a yoke and ball stud type of tie rod end embodying the joint of this invention; and Fig. 8 illustrates a further form of yoke and ball stud tie rod end especially adaptable for parallelogram steering mechanisms and embodying the joint of this invention; and Figs. 9 and 10 are two views of the combination spring nest and ball stud seat member as shown either in Fig. 7 or Fig. 8; and Figs. 11, 12, 13 and 14 are four views of a spring nest comprised of inter-engaging parts affording support to the complete circumference of the enclosed spring throughout the full adjusting range.

Tie rod ends are most generally associated with the steering mechanism of a motor vehicle, however, there are numerous other applications where the joint of this invention finds ready acceptance and use. For example, the numerous compound levers on aircraft in which positive action without lag or lost motion is a prerequisite and wherein friction and binding is not only undesirable but a safety hazard. Further, heavy duty remote controls on machinery and rail vehicles embodying the features above described are desirable. Therefore it is not the intention to limit this invention to the illustrated embodiments of a motor vehicle tie rod end but to claim all formal modifications of such a joint as hereinafter described and fairly within the scope of this invention as covered by the appended claims.

For a more detailed illustration of the spring element per se and an exposition on the mechanics thereof reference may be had to my copending application for United States Letters Patent filed March 13, 1939, and serially numbered 261,443 for Self-adjusting piston.

Reference may now be had to Figs. 1 and 2 in which a tie rod 15 has the end thereof internally bored and threaded for a short distance. The end section also has an axial slot 16 therein, the purpose of which will become apparent immediately. An eye bolt 17 is threaded into each end of the tie rod, and when in proper axial position, a clamp 18 surrounding the outside of the slotted threaded section is tightened by adjusting the locking structure, tending to close the slot 16 and grip the eye bolt firmly. The opening 19 through this eye has an inturned flange 20 adjacent the bottom thereof upon which is supported an annular apertured seating element 21 whose inner wall is inwardly curved to form a parti-spherical bearing surface.

A ball stud 22, whose head 23 is shaped to conform to the surface of the parti-spherical bearing portion of the seating element 21, has the head located within this element with its shaft projecting through the aperture therein. In the outer face of the head is an indentation 24 located on the center of the head radii and serving as a center point for a raised head or nubbin 25 on one part of a stamped spring nest comprised of the annular member 26 having a central depressed portion 27 of a narrow semi-cylindrical conformation and an annular complementary-shaped outer cover member 28 having the marginal edge thereof pressed in a circumferential groove 29 of opening 19 adjacent its outer edge.

A self-adjusting spring 30 formed of a resilient closely wound ribbon metal is housed partially within each of the spring nest members 26 and 28 and bears against oppositely dished complementary portions thereof tending to separate the two and forming a divided head as shown in the exploded view of Fig. 3. The outward pressure on the member 26 caused by the low radial force of the enclosed self-adjusting spring will be transmitted to the head 23 of the ball stud and absorbed by the seating element 21, thereby keeping the inter-engaged parts constantly in a zero clearance condition. This spring may be selected to have any predetermined minimum outward force desired to secure proper bearing pressures, and at the same time have a relatively greater resistance to external forces tending to collapse the spring, by a proper selection of the thickness of the ribbon, and the length and number of coils formed thereby for a given diameter. The various considerations to be given to the spring design are more completely covered in my aforementioned copending application.

The shaft of the ball stud 22 has a laminated apertured cover member 32, of spring metal in which the inner marginal edge thereof is flexed inwardly and tightly encircles the circumference thereof, while its outer marginal edge is tensioned against the lower side of the eye bolt. Axially inward from this cover member and bearing thereagainst is an annular apertured rubber gasket element 33 affording noiseless movement therebetween, and completing the dirt sealing means is an apertured metal washer 34, loosely fitted around the shaft of the ball stud and accommodating full oscillation therein, bearing against the lower marginal edge of opening 19 and backing up the rubber gasket element. These three portions spaced by the resilient gasket form a dirt proof joint and are maintained tightly together.

In operation, the stud may rotate about the head, the sides of the head 23 sliding on the complementary surfaces of the bearing member 21 and maintained constantly thereagainst for all operating positions by the free-floating member 26 pressed thereto upon the center of the radii of the ball stud under the expansive action of the self-adjusting spring 30. The laminated spring-metal cover member resiliently follows the outer periphery of the shaft 22 by the inturned flange sufficiently to cover the opening in all positions. As these parts wear, the spring 30 will push the stud down effecting a zero clearance with the bearing 21 and the cover member 32 and at all times maintain a tight joint.

In Figs. 4 and 5 is shown a modified form of this invention. The principal distinction in this construction is that the threaded eye bolt 40 has an opening 41 of parti-spherical conformation defined by the inwardly curved walls of the eye and serving as a direct seat for the head 42 of the stud shaft 43 that extends through a tapered opening 44 in the upper end of the eye. In this case a semi-cylindrical cavity 45 is formed in the face of the stud head to accommodate a portion of a self-adjusting spring 30. A free-floating, stamped, annular member 46 has a central depressed portion 47 of semi-cylindrical conformation forming a smooth fitting spring nest for the remaining portion of the periphery of an annularly wound spring 30. In the lower periphery of the opening 41 is cut a circumferential groove 48, in which the outer peripheral edge of a stamped annular cover member 49 is supported. The central part of this cover member has a shallow depressed parti-spherical portion serving as a sliding seat for a complementary shaped portion 50 of the spring nest element 46 overlying the portion 47 thereof. That is to say, since the depressed portion 47 of the spring nest is semi-cylindrical on its outer periphery, as best shown in Fig. 5, the sliding seat 50 must have parti-spherical periphery to afford sliding movement between it and the similar complementary shaped portion of the cover member 49 during oscillation of the ball stud. Fig. 6 illustrates an exploded view of the spring element, the spring nest, and cover member.

The upper portion of the stud shaft tapers outwardly from the head, has a flat circular portion 51 and then tapers inwardly toward the threaded end. Adjacent the circular surface 51 is secured a dome-shaped metal washer 52 whose inner periphery is pressed over said circular surface and fits snugly to the outer periphery of the stud shaft, the outer surface curving down around the upper surface of the eye but being separated therefrom by a washer 53 to form a dirt-proof joint. A circular washer 54 is also placed around the stud shaft between the metal washer and the lower edge of the steering arm (not shown) to give a tight fit. This type joint operates in substantially the same manner as the former, but due to the inwardly curved formation of the wall of the eye the separate bearing member is not necessary; and since the head of the ball stud is machined out to form a partial spring nest an extra nesting member is also eliminated.

In Fig. 7 is illustrated a further modified form of tie rod having a joint on the end thereof and embodying the present invention in a so-called yoke and ball stud type. In this design the tie rod 60 has the end thereof counterbored and threaded a short distance of the bore. The outer wall of the counterbored end of the tie rod has an opening 62 therethrough spaced axially inward from the threaded portion and through which the ball head 63 of the stud shaft 64 is inserted. Prior to this assembly a spring nesting member 65 is seated in the inner end of the counterbore, as shown. The self-compensating spring 30 is then seated in the spring nest and a combination spring nesting member and ball head seat 66 is next inserted through the open end of the counterbore. The ball head 63 is then inserted through the opening 62 and seated in the parti-spherical seat of the member 66 and thereafter a closure member 67 is threaded into the tie rod to close the end thereof, and in which is formed a parti-spherical seat to complete the ball head socket.

In this construction it will be apparent to those skilled in this art that the steering forces and/or road shocks are directly transmitted to the automatic compensating spring 30. The spring element as aforementioned has a relatively greater differential resistance to external forces tending to effect radial collapse thereof than it has inherent expansive force. External applied forces increase the inter-coil pressure and static friction between the adjacent convolutions of the coils thus increasing resistance to any circumferential movement therebetween, which circumferential movement is necessary before radial inward movement can take place. This automatic self-compensating spring having an unequal differential resistance between the expansive force and reactive force necessary to effect displacement thereof, prevents any axial movement of the stud in relation to the yoke, which obviously would afford slack or lost motion in the steering mechanism. It will now be apparent that a conventional helical wound spring would resist axial forces on the yoke against or through the stud head only to an extent equal to the force with which it bears against the stud head. Assuming this pressure is light, to permit ease of control and low friction therebetween, then some axial forces will depress the spring and produce lag and play in the steering mechanism. On the other hand, the resistance to partial compression of the automatic compensator here described has been shown and its light outward force is readily evident.

Fig. 8 is a further modified form of this invention very similar in principle to that just described in Fig. 7 and especially adapted to parallelogram steering mechanisms. This construction comprises a double stud steering connection tie rod, as differentiated from the single end rod of Fig. 7, and adjustable with equal ease. In this mechanism the tie rod 70 has at one end an axial counterbore therein which is internally threaded for a short distance thereof adjacent its outer axial opening. The peripheral wall of the counterbored end of the tie rod has axially spaced openings 72 and 73 therethrough adjacent its outer and inner end and through which the ball heads 74 and 75 of the stud shafts 76 and 77 extend, respectively, and in diametrical opposite directions. In this assembly, a spring nest member 78 is seated in the inner axial end of the counterbore, as shown, and the head 74 of stud shaft 76 is inserted through opening 72 and seated in member 78. An annular combination ball head seat and spring nest member 79, as shown in Figs. 9 and 10, having a parti-spherical seat on its inner end for reception of the ball head and a semi-cylindrical cavity on its opposite outer face for seating the spring element, is next inserted in the counterbore. The self-compensating spring 30 is then seated in the semi-cylindrical cavity of member 79 and a second combination member 80, exactly like member 79, is placed in the counterbore in reverse order so as to form the remaining portion of the divided-head spring nest. Lastly the ball head 75 of stud shaft 77 is introduced through opening 73, seating in the parti-spherical cavity of member 80, and a threaded closure member 81 having a parti-spherical surface on its inner end completes the seat for the ball head being screwed into the threads of the counterbore until the desired adjusted distance between the ball stud shafts is reached and then the closure 81 is secured against rotation.

If adjustment of the stud shafts is required it is only necessary to back out the locking closure member 81 until the desired position of the stud is reached, as the self-compensating spring will obviously automatically expand and move the stud shafts axially apart as the restraining tension of the closure member is released. Now to adjust the stud shafts axially inward or closer together the same general procedure is followed, but in this operation the locking closure member 81 is rotated so as to screw the threaded closure 81 in a clockwise direction. However, as this operation is initiated, the self-adjusting spring element 30, due to its design, greatly resists the radial collapse necessary to move the stud shafts axially together and some means must be used to momentarily partially release this resistance to radially inward movement. Under this condition a shock or series of sharp blows is applied to the outer end of the closure adjusting tool at the same time a clockwise torque is being exerted thereon. The shock transmitted through the intermediate abutting members to the annularly wound spring 30, now locked, will momentarily break the static friction between its adjacent coils and permit a slight rotation of the outer closure member inward and consequent peripheral decrease of the spring, provided that the clockwise torque being applied to the threaded closure is picked up immediately before the spring has had an opportunity to re-expand outwardly from the effect of the blow and again take up the compensated clearance. The necessity for the dual forces being applied to the adjusting tool is a relatively easy operation to perform, and indicates the effectiveness of this joint embodying the self-compensating spring and the impossibility of any combination of steering forces and/or road shocks that could effect a collapse of the annular spring element.

It will be evident from the various spring nest members 25, 28, 46, 65, 66, 79 and 80 previously described that the outer periphery of the spring element 30 is not completely covered due to the split at the divided head. In the former constructions for more accurate control over the spring movement and to prevent the possibility of the end of the outer coil from wedging in the split, there may be substituted the construction provided, as shown in Figs. 11, 12, 13 and 14, a divided spring nest, generally designated 90, of overlapping design affording support to the spring around its entire outer periphery throughout the adjusting angle. In this construction it will be seen that the dividing line between the two portions 91 and 92 is a stepped or broken line, as in Fig. 11. Since the spring 30, nested within the two portions 91 and 92, extends laterally across the stepped dividing line thereof changes in the compensated length of the spring will not be sufficient to separate the overlapping of the parts provided by the stepped parting line and affording support to the entire outer periphery of the spring.

While this invention has been described in detail with various forms of tie rod ends most generally associated in connection with steering mechanisms of motor vehicles, it will be apparent there are many other varied applications where a similar compound movement joint may be used and where this teaching would be readily acceptable. It is therefore not the intention to limit this invention to the preferred specific embodiments illustrated on the drawings but to include all formal modifications and changes therein fairly within the scope of the broad invention and limited in extent only by the scope of the appended claims.

What I claim is:

1. A joint comprising a pair of relatively movable elements having cooperating ball and socket parts, a radially contractible coil spring for resiliently maintaining said ball and socket parts in bearing engagement, spaced relatively movable opposed housing means having spring seats conforming to the curvature of the circumferential surface of said spring and so disposed on diametrically opposite sides of said spring as to have separating force exerted thereon, and means on one of said parts holding one of said opposed housing means for maintaining said housing means in operative relation.

2. A joint comprising a pair of relatively movable elements having cooperating ball and socket parts, a radially contractible coil spring for resiliently maintaining said ball and socket parts in bearing engagement, spaced relatively movable opposed housing means having spring seats conforming to the curvature of the circumferential surface of said spring and so disposed on diametrically opposite sides of said spring as to have separating force exerted thereon, and means on one of said parts holding one of said opposed housing means for maintaining said housing means in operative relation, said other opposed means having movable engagement with the other of said parts.

3. A joint comprising a pair of relatively movable elements having cooperating ball and socket parts, a radially contractible coil spring for resiliently maintaining said ball and socket parts in bearing engagement, movable housing means having a spring seat conforming to the curvature of the circumferential surface of said spring, said ball part being provided with housing means having a spring seat conforming to the curvature of the circumferential surface of said spring and adapted to coact with said movable housing means, said housing means being so disposed on diametrically opposite sides of said spring as to have separating force exerted thereon, and means on the socket part for confining the movable housing means therein.

4. A joint comprising a pair of relatively movable elements having cooperating ball and socket parts, a radially contractible coil spring for resiliently maintaining said ball and socket parts in bearing engagement, spaced relatively movable opposed housing means having spring seats conforming to the curvature of the circumferential surface of said spring and so disposed on diametrically opposite sides of said spring as to have separating force exerted thereon, and means for retaining said opposed means in said socket member and in operative relation to each other and maintaining the spring therebetween.

EUGENE S. WITCHGER.